(12) United States Patent
Kouno et al.

(10) Patent No.: US 8,905,100 B2
(45) Date of Patent: Dec. 9, 2014

(54) TIRE

(75) Inventors: Yoshihide Kouno, Kodaira (JP); Seiji Kon, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 385 days.

(21) Appl. No.: 13/202,019

(22) PCT Filed: Feb. 18, 2010

(86) PCT No.: PCT/JP2010/052460
§ 371 (c)(1),
(2), (4) Date: Aug. 17, 2011

(87) PCT Pub. No.: WO2010/095688
PCT Pub. Date: Aug. 26, 2010

(65) Prior Publication Data
US 2011/0297283 A1 Dec. 8, 2011

(30) Foreign Application Priority Data

Feb. 18, 2009 (JP) ................................. 2009-035952

(51) Int. Cl.
*B60C 3/00* (2006.01)
*B60C 13/00* (2006.01)

(52) U.S. Cl.
USPC ........................................... 152/454; 152/523

(58) Field of Classification Search
None
See application file for complete search history.

(56) References Cited

U.S. PATENT DOCUMENTS

| | | | |
|---|---|---|---|
| 4,201,744 A | 5/1980 | Makinson | |
| 4,341,249 A | 7/1982 | Welter | |
| 2007/0267118 A1 | 11/2007 | Puhala et al. | |

FOREIGN PATENT DOCUMENTS

| | | | |
|---|---|---|---|
| CN | 1714003 A | | 12/2005 |
| DE | 1 035 500 | | 7/1958 |
| FR | 2429111 | * | 2/1980 |
| GB | 1191894 | * | 5/1970 |
| GB | 1442147 | * | 7/1976 |
| GB | 1471883 | * | 4/1977 |
| JP | 54-162307 A | | 12/1979 |
| JP | 55-11894 A | | 1/1980 |
| JP | 3-142701 A | | 6/1991 |
| JP | 3-143701 A | | 6/1991 |
| JP | 2672065 B2 | | 7/1997 |
| JP | 10-147113 | * | 6/1998 |
| JP | 2000-79809 | * | 3/2000 |

(Continued)

OTHER PUBLICATIONS

Chinese Office Action, dated Mar. 1, 2013, issued in corresponding Chinese Patent Application No. 201080008047.2.

(Continued)

*Primary Examiner* — Justin Fisher
(74) *Attorney, Agent, or Firm* — Sughrue Mion, PLLC (57) ABSTRACT

A tire formed from a resin material is provided having a high stress withstanding ability and capable of maintaining a high internal pressure.

By configuring the side sections 14 with plural circular arc curve faced portions 32 having curvature in the circumferential direction formed successively along the circumferential direction the stress acting on the side sections 14 can be distributed at a radial direction stress and a circumferential direction stress. Accordingly, the radial direction stress can be reduced further than in a conventional profile not provided with any circular arc curve faced portions along the circumferential direction, enabling sufficient pressure withstanding ability (internal pressure) to be secured for a pneumatic tire for use on a vehicle even though a thermoplastic material with weaker stress than that of rubber is employed for the side sections 14.

11 Claims, 8 Drawing Sheets

(56) References Cited

FOREIGN PATENT DOCUMENTS

| | | | |
|---|---|---|---|
| JP | 2000-158906 | * | 6/2000 |
| JP | 3320420 B2 | | 9/2002 |
| JP | 2003-104005 A | | 4/2003 |
| JP | 2003-104008 A | | 4/2003 |
| JP | 2005-53248 | * | 3/2005 |
| JP | 2008-264543 | * | 11/2008 |
| JP | 2008-542103 A | | 11/2008 |
| WO | 2007/045870 A1 | | 6/2004 |
| WO | 2007/032405 A1 | | 3/2007 |

OTHER PUBLICATIONS

Korean Office Action, dated Jan. 23, 2013, issued in corresponding Korean Application No. 10-2011-7021352.
International Search Report for PCT/JP2010/052460 dated May 18, 2010.
Extended European Search Report issued in European Application No. 10743814.5 dated Jul. 3, 2013.
Japanese Office Action dated Oct. 22, 2013, issued in corresponding Japanese Patent Application No. 2011-500648.

* cited by examiner

TIRE

CROSS REFERENCE TO RELATED APPLICATIONS

This application is a National Stage of International Application No. PCT/JP2010/052460filed on Feb. 18, 2010, which claims priority from Japanese Patent Application No. 2009-035952, filed on Feb. 18, 2009, the contents of all of which are incorporated herein by reference in their entirety.

TECHNICAL FIELD

The present invention relates to a tire for rim mounting, and in particular to a tire with at least a side section formed from a resin material.

BACKGROUND ART

Pneumatic tires configured with rubber, organic fiber material, and steel members are traditionally employed on vehicles such as cars.
However, there is a limit to application of post-use recycling of rubber, and disposal is performed by such processes as combustion and shredding for use as pavement materials for roads.
There is demand recently to use materials such as resin materials, thermoplastic resins and thermoplastic elastomers as tire materials due to their advantages from the perspectives of weight reduction, ease of formability, and ease of recycling.
For example, a pneumatic tire formed using a thermoplastic polymer material is described in Patent Document 1.
Patent Document 1: Japanese Patent Application Laid-Open No. 03-143701.

DISCLOSURE OF INVENTION

Technical Problem

Tires employing thermoplastic polymer materials such as the one described in Patent Document 1 are easier to manufacture and lower in cost than conventional rubber tires. However, when a thermoplastic polymer material is employed and a tire frame body is formed from a uniform material without internal installation of a reinforcement member, such as a carcass ply, the tire is inferior to an ordinary rubber tire from perspectives such as stress withstanding ability and internal pressure withstanding ability, leading to concern regarding safety margin for pressure withstanding ability when maintained at a high internal pressure. There are various methods proposed in order to avoid such issues, such as embedding reinforcement members and increasing the thickness of materials, however these result in more complicated manufacturing processes, and tend to increase weight, and there is hence a need for improvement.
The present invention is made to address the above issues and is directed towards provision of a tire formed from a resin material with higher stress withstanding ability and capable of maintaining a higher internal pressure.

Solution to Problem

In conventional rubber pneumatic tires, in order to raise the pressure withstanding ability there are various proposals relating to the profile of the side sections when viewed in a cross-section along the tire rotation axis, however the existing methods are currently close to the limit from the perspective of performance improvement. As a result of diligent research the inventors have come up with a tire circumferential direction profile for side sections that has not previously been considered, but which enables the stress withstanding ability to be raised, and the pressure withstanding ability to be enhanced.

In consideration of the above circumstances a first aspect of the present invention is a tire including a pair of side sections and an outer peripheral section connecting together radial direction outside edges of the pair of side sections, wherein: at least the side sections are formed from a resin material; and plural curved portions each having at least curvature in the tire circumferential direction are formed to the side sections along the tire circumferential direction.

Explanation follows regarding operation of a tire according to the first aspect. The following Equation (1) is known to shown equilibrium in a hollow membrane body of donut shape (see, for example, "Tire Technology—From Introduction to Application" by Hideo Sakai (published by Grand Prix)).

$$P/h = \sigma s/Rs + \sigma t/Rt \qquad \text{Equation (1)}$$

Wherein: P is internal pressure;
h is the thickness of the side sections;
σs is the stress in the radial direction of the side sections;
σt is the stress in the circumferential direction of the side sections.
Rs is the radius (of curvature) of the side section inside face when viewed in a cross-section of the side section along the tire rotation axis (an average value); and
Rt is the radius (of curvature) of the side section inside face when viewed in a cross-section of the side section along a circumferential direction (an average value).

Since there is no curvature along the circumferential direction of the side section in a conventional pneumatic tire (the curvature in the circumferential direction of the side sections is infinity), the equilibrium force is determined by P/h=σs/Rs without using the second term on the right hand side of Equation (1) (σt/Rt). Accordingly, there is a limit to raising the pressure withstanding ability (internal pressure P) by adjusting the three factors σs, h, and Rs.

In the tire according to the first aspect, since the side sections are configured with plural curved portions formed to the side sections each having at least curvature in the tire circumferential direction the Equation (1) can be applied. Hence, two stresses can be employed for the pressure withstanding ability (internal pressure P) of the tire, the radial direction stress and the circumferential direction stress, enabling the radial direction stress to be decreased in comparison to conventionally by the acting amount of the circumferential direction stress, and the pressure withstanding ability (internal pressure) can be raised.

Furthermore, in a tire according to the first aspect, since the pressure withstanding ability can be raised by the design of the profile of the side sections, this decreases the need to employ measures for raising the pressure withstanding ability which would lead to an increase tire weight, such as increasing the thickness of the side sections and/or embedding a reinforcement member. Furthermore, this facilitates unproblematic use in a tire for an automotive vehicle of a resin material that has weaker stress than vulcanized rubber.

A second aspect of the present invention is the tire according to the first aspect wherein the tire radial direction inside of each of the side sections includes a bead section that makes contact with a bead seat and a rim flange of a rim, and a ring shaped bead core made from a metal material is embedded in the bead section.

Explanation next follows regarding operation of the tire according to the second aspect.
Similar robustness of retention of the tire to the rim can be obtained to that of a conventional rubber pneumatic tire by embedding the ring shaped bead core made from a metal material in the bead section that is the fitting location to the rim.

A third aspect of the present invention is the tire according to the first aspect or the second aspect wherein the tire is configured by the resin material from the side sections to the outer peripheral section.

Explanation next follows regarding operation of a tire according to the third aspect. By configuring from the side sections to the outer peripheral section with a resin material, namely by configuring the tire with a resin material from one of the side sections to the other of the side sections, the proportion of resin material in the whole of the tire is increased, enhancing recyclability.

A fourth aspect of the present invention is the tire according to any one of the first aspect to the third aspect further including a reinforcement layer formed by winding a cord, having higher rigidity than that of the resin material, in a spiral shape on the outer peripheral section with at least a portion of the cord embedded in the outer peripheral section.

Explanation follows regarding operation of the tire according to the fourth aspect. The side of the tire making contact with the road surface is reinforced due to provision of the reinforcement layer formed by winding a cord having higher rigidity than that of the resin material in a spiral shape at the tire radial direction outside. The reinforcement layer performs a role equivalent to that of a belt layer in rubber pneumatic tire.
Consequently, by providing the reinforcement layer the puncture resistance ability, damage resistance ability, circumferential direction rigidity and creep prevention effect can be enhanced compared to cases in which no reinforcement layer is provided. The pressure withstanding ability can also be raised in a state tensioned by internal pressure due to provision of the reinforcement layer at the tire outer peripheral section. In addition, by embedding the reinforcement layer at the outer peripheral section strength without displacement occurring due to force input during running can be maintained with certainty.

A fifth aspect of the present invention is the tire according to the any one of the first aspect to the fourth aspect further including a seal portion provided at a portion of the tire that makes contact with the rim and configured from a material that is softer than the resin material such that air does not leak out from inside the tire.

Explanation next follows regarding operation of a tire according to the fifth aspect. The sealing ability between the tire and the rim is raised by provision of the seal portion configured from a material that is softer than the resin material at a portion of the tire that makes contact with the rim. Consequently, a greater suppression of air from leaking out from inside the tire can be achieved than in cases where sealing is between the rim and the resin material. Rim fitability is also enhanced by provision of the seal portion.

A sixth aspect of the present invention is the tire according to any one of the first aspect to the fifth aspect further including a tread rubber layer provided at the portion of the tire making road surface contact, the tread rubber layer configured from a rubber having abrasion resistance superior to that of the resin material.

Explanation next follows regarding operation of a tire according to the sixth aspect. By provision of the tread rubber layer configured from a rubber having abrasion resistance superior to that of the resin material at the portion making contact with the road surface the abrasion resistance and the damage resistance can be raised compared to cases in which there is no rubber provided at the portion making contact with the road surface.

A seventh aspect of the present invention is the tire according to any one of the first aspect to the sixth aspect, wherein the curved portions include at least one of a first curved portion having a center of curvature on the tire inside or a second curved portion having a center of curvature on the tire outside.

Explanation follows regarding operation of a tire according to the seventh aspect. Raised pressure withstanding ability can be achieved if there is at least one or other of a first curved portion having a center of curvature on the tire inside and/or a second curved portion having a center of curvature on the tire outside.

An eighth aspect of the present invention is the tire according to any one of the first aspect to the seventh aspect, wherein the side sections satisfy the relationship $0.1 \leq Rt/Rs \leq 1.0$, wherein Rs is the radius of curvature at a side section inside face when viewed in a cross-section taken along the tire rotation axis and Rt is the radius of curvature at the side section outside face when viewed in a cross-section taken along the circumferential direction.

Explanation follows regarding operation of a tire according to the eighth aspect. By satisfying $0.1 \leq Rt/Rs \leq 1.0$ the require pressure withstanding ability of the side section can be secured while also securing flexibility as a tire.

A ninth aspect of the present invention is a tire according to any one of the first aspect to the eighth aspect, wherein the resin material has thermoplastic properties.

Explanation next follows regarding operation of a tire according to the ninth aspect. Then resin material component of no longer needed tires can be melted due to the resin material having thermo plastic properties, and so recyclability can be enhanced.

Advantageous Effects of Invention

A tire of the present invention as explained above exhibits the effect of enabling stress withstanding ability to be raised, and a high internal pressure to be maintained.

DESCRIPTION OF EMBODIMENTS

Explanation follows regarding a tire according to an exemplary embodiment of the tire of the present invention, with reference to the drawings.

Figure 1A:
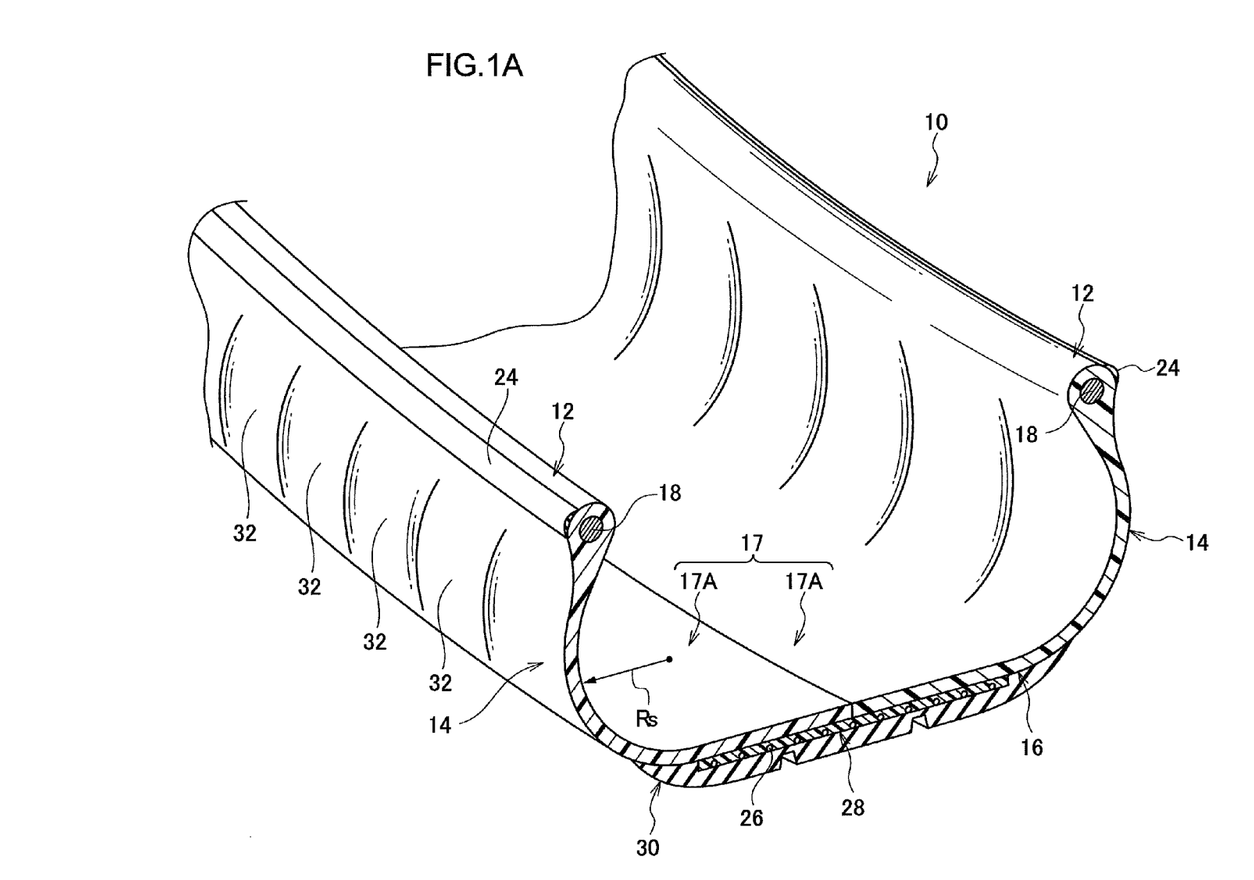
FIG. 1A is a perspective view of a cross-section of a portion of a tire according to an exemplary embodiment of the present invention.
Figure 1B:
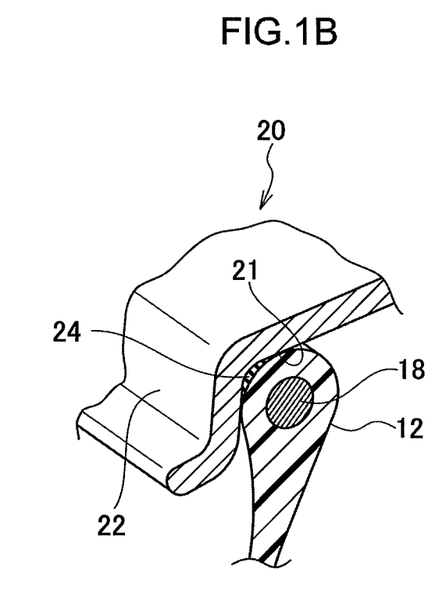
FIG. 1B is a cross-section of a bead portion mounted to a rim.

As shown in FIG. 1, a tire 10 of the present exemplary embodiment displays a substantially similar cross-section profile to that of an ordinary conventional rubber pneumatic tire. The tire 10 is equipped with: a pair of bead sections 12 that make contact with a bead seat section 21 and a rim flange 22 of a rim 20; side sections 14 that extend from the bead sections 12 towards the tire radial direction outside; and a crown section 16 that connects together the tire radial direction outside edge of one of the side sections 14 and the tire radial direction outside edge of the other of the side sections 14. The bead sections 12, the side sections 14 and the crown section 16 are formed from a resin material.

The tire 10 of the present exemplary embodiment is equipped with a tire case 17 configured by: the pair of bead sections 12 that make contact with the bead seat section 21 and the rim flange 22 of the rim 20; the side sections 14 that extend from the bead sections 12 towards the tire radial direction outside; and the crown section 16 that connects together the tire radial direction outside edge of one of the side sections 14 and the tire radial direction outside edge of the other of the side sections 14.

The tire case 17 of the present exemplary embodiment is formed from a single resin material. The tire case 17 of the present exemplary embodiment is formed by mutually aligning circular ring shaped tire halves 17A, each formed in similar shapes to each other by integrating together, such as by molding, one of the bead sections 12, one of the side sections 14, and a half width crown section 16, and bonding together the tire halves 17A along a tire equatorial plane face portion. The tire case 17 is not limited to a tire case formed by bonding together two members, and the tire case 17 may be formed by bonding together 3 or more members, or by forming the pair of bead sections 12, the pair of side sections 14 and the crown section 16 into a single unit.

Examples of materials that can be employed as the resin material include thermoset resins, thermoplastic resins and thermoplastic elastomers (TPE) having resilience similar to that of rubber, however a thermoplastic elastomer is preferably employed in consideration of the resilience required during running and formability during manufacture.

Examples of such thermoplastic elastomers include, for example, amide thermoplastic elastomers (TPA), ester thermoplastic elastomers (TPC), olefin thermoplastic elastomers (TPO), styrene thermoplastic elastomers (TPS), urethane thermoplastic elastomers (TPU), thermoplastic cross-linked rubber (TPV) or other thermoplastic elastomers (TPZ), as defined in JIS K6418.

Examples of thermoplastic resins include, for example, urethane resins, olefin resins, vinyl chloride resins and polyamide resins.

Examples of thermoset resins include, for example, phenol resins, urea resins, melamine resins, epoxy resins, and polyester resins.

In the present exemplary embodiment the tire case 17 is formed from a synthetic thermoplastic resin.

A circular ring shaped bead core 18 formed from a steel cord is embedded in each of the bead sections 12 of the present exemplary embodiment, similarly to as in an ordinary conventional pneumatic tire, however the bead core 18 may be omitted as long as sufficient rigidity of the bead sections 12 is achieved and no problems arise in fitting to the rim 20.

In the present exemplary embodiment the contact portion of the bead sections 12 to the rim 20, at least the portion that makes contact with the rim flange 22 of the rim 20, is formed from a circular ring shaped seal layer 24 formed from a rubber that is both soft and resilient to give excellent sealing ability (air sealing ability). The seal layer 24 may also be formed at the portion that makes contact with the bead seat. Preferably a similar type of rubber to that employed on the bead portion outer face of an ordinary conventional rubber pneumatic tire is used for the rubber for forming the seal layer 24.

The rubber seal layer 24 may be omitted as long as sealing ability can be secured to the rim 20 by the synthetic thermoplastic resin alone. Configuration may also be made employing another type of synthetic thermoplastic resin having superior sealing ability to that of the synthetic thermoplastic resin forming the side sections 14.

A crown reinforcement layer 28 including spirally wound cord 26, made from steel or organic fibers, is provided at the outer peripheral face of the crown section 16. The crown reinforcement layer 28 corresponds to a belt disposed at the outer peripheral face of the carcass in a conventional rubber pneumatic tire.

The crown reinforcement layer 28 may be configured with the cord 26 alone, or may be configured with the cord 26 in a sheet form covered by a synthetic thermoplastic resin, for example. In the present exemplary embodiment the crown reinforcement layer 28 is configured by the cord 26 embedded in a synthetic thermoplastic resin sheet.

A tread rubber layer 30 is disposed at the outer peripheral side of the crown reinforcement layer 28, with the tread rubber layer 30 configured from a rubber with superior abrasion resistance characteristics that the thermoplastic material forming the side sections 14. Preferably a similar type of rubber to the rubber employed in a conventional rubber pneumatic tire is employed as the rubber used in the tread rubber layer 30.

Configuration may be made with a tread layer provided at an outer peripheral section and formed from another type of thermoplastic material with superior abrasion resistance characteristics to those of the thermoplastic material forming the side sections 14.

The tire 10 of the present exemplary embodiment has side sections 14 with radii of curvature formed along the circumferential direction.

Figure 2A:
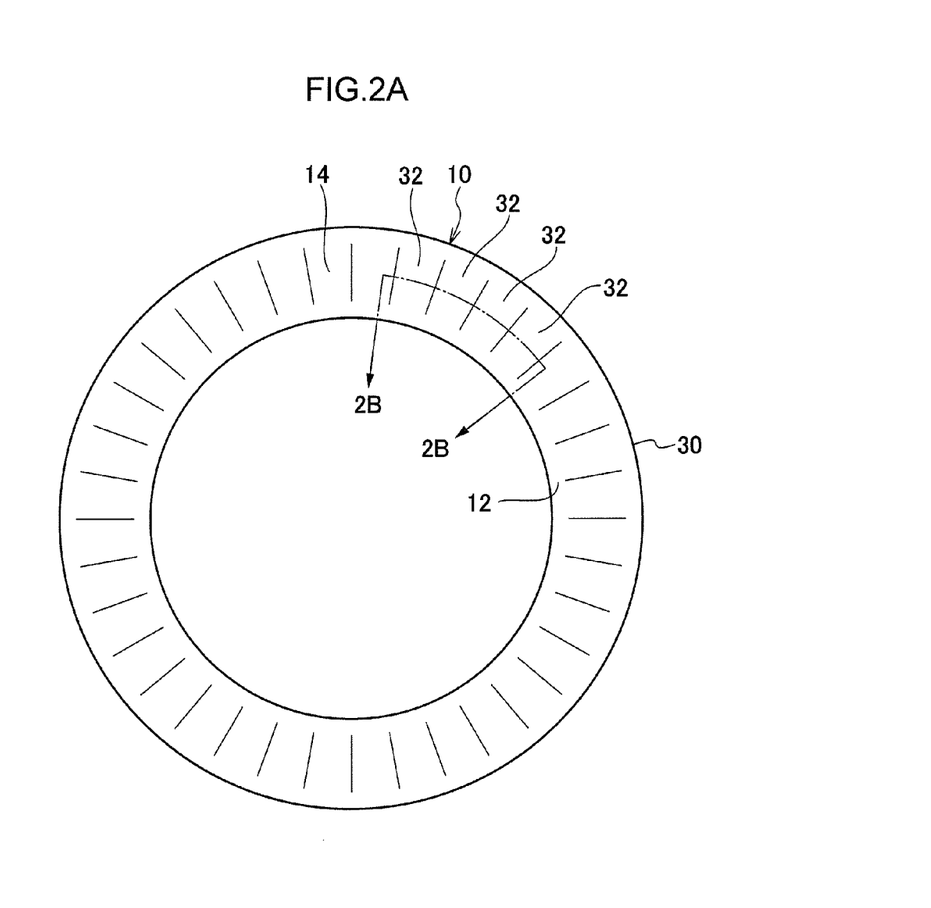
FIG. 2A is a side view of a tire.
Figure 2B:
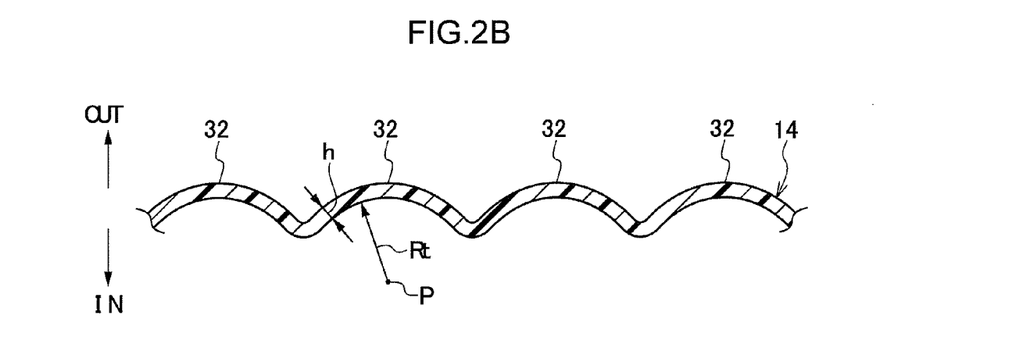
FIG. 2B is a cross-section a side section taken along the circumferential direction (taken on line 2B-2B of FIG. 2A).

More specifically, in a cross-section of the side sections 14 along the circumferential direction as shown in FIG. 2B, the side sections 14 of the present exemplary embodiment have plural connected circular arc curve faced portions 32 having a center of curvature P on the tire inside (the arrow IN direction).

As shown in FIG. 1A, the cross-section profile of the side sections 14 along the tire rotation axis (the circular arc cross-section profile of the circular arc curve faced portion 32 along the tire rotation axis) exhibits a similar circular arc profile to that of a conventional rubber pneumatic tire, specifically having an overall a center of curvature on the tire inside. However configuration may be made such that a portion of the circular arc profile portions may have a center of curvature on the tire outside prior to inflating with air.

In the following Equation (1) h is the height of the side sections 14 as shown in FIG. 2B, Rs is the radius of curvature (average value) in the radial direction on the inside face of the circular arc curve faced portions 32 of the side sections 14 as shown in FIG. 1A, and Rt is the radius of curvature (average value) in the circumferential direction on the inside face of the circular arc curve faced portions 32 as shown in FIG. 2B. These radii of curvature may, for example, each be measured as a radius of curvature at 10 evenly spaced points, with the average taken thereof.

$$P/h = \sigma s/Rs + \sigma t/Rt \qquad \text{Equation (1)}$$

When the tire 10 is employed on a car, the number of the circular arc curve faced portions 32 disposed around the circumferential direction with center of curvature on the same side is in the range of 6 to 90, and is preferably in the range of 12 to 60. The number of the circular arc curve faced portions 32 disposed along the circumferential direction is however not limited to the above ranges, and may be appropriately varied according to such factors as the size and loading of the tire.

The circular arc curve faced portions 32 are preferably disposed at even intervals along the tire circumferential direction from the perspective of achieving uniformity.

The ratio Rt/Rs of the circular arc curve faced portion 32 circumferential direction radius Rt to the circular arc curve faced portion 32 radial direction radius Rs is preferably set such that $0.01 \leq Rt/Rs \leq 10$, and more preferably $0.1 \leq Rt/Rs \leq 1.0$.

When the tire 10 is employed on a car, the circular arc curve faced portion 32 circumferential direction radius Rt is preferably set in the range of 5 to 40 mm. The circular arc curve faced portion 32 circumferential direction radius Rt is appropriately varied according to such factors as the tire size and loading on the tire during use.

The thickness T of the circular arc curve faced portion 32 is appropriately varied according to the vertical spring constant, ride comfort and durability of the tire 10, and physical properties of the thermoplastic material.

In the present exemplary embodiment the thickness T of the circular arc curve faced portion 32 is constant along the tire circumferential direction and the tire radial direction, however configuration may be made with local differences along the circumferential direction and/or with local differences along the tire radial direction.

In the present exemplary embodiment the bead cores 18 are embedded in the bead sections 12, however the bead cores 18 may be omitted as long as fitting strength to the rim 20 can be secured.

Operation

In the tire 10 of the present exemplary embodiment an air chamber is formed to the rim 20 by mounting the tire 10 on the rim 20 similarly to an ordinary conventional rubber pneumatic tire, air is then filled into the air chamber and the tire is employed for running. Due to filling air into the tire stress acts on the tire as a whole due to the air pressure.

In the tire 10 of the present exemplary embodiment, due to there being plural of the circular arc curve faced portions 32 having curvature in the circumferential direction formed successively along the circumferential direction to the side sections 14, the stress acting on the side sections 14 can be distributed as a radial direction stress and a tire circumferential direction stress. Accordingly the radial direction stress can be reduced in comparison to a conventional profile not provided with the circular arc curve faced portions along the circumferential direction, facilitating securing sufficient pressure withstanding ability (internal pressure) for a pneumatic tire used on a vehicle even though a thermoplastic material is employed in the side sections 14. Accordingly, it becomes possible to secure pressure (internal pressure) resisting ability with the profile of the side sections 14 alone, enabling omission of a carcass that is required in a conventional rubber pneumatic tire.

In the tire 10 of the present exemplary embodiment, the tire case 17 can be formed by methods such as vacuum molding, air pressure molding, melt casting and injection molding, enabling manufacturing processes to be greatly simplified in comparison to that of a conventional rubber pneumatic tire.

In the tire 10 of the present exemplary embodiment, there is a large proportion of thermoplastic material in the tire configuring materials, giving good recyclability. In the tire 10 of the present exemplary embodiment, a similar fitting strength to the rim 20 can be secured to that of a conventional rubber pneumatic tire due to the bead cores 18 being embedded in the bead sections 12.

The crown reinforcement layer 28 of the present exemplary embodiment for reinforcing the crown section 16 is formed by winding a cord with higher rigidity than that of the thermoplastic material in a spiral shape, and so similar operation is obtained to that of a spiral belt provided in a conventional rubber pneumatic tire, and such properties as puncture resistance properties, damage resistance properties and creep preventing effect can be raised.

In the tire 10 of the present exemplary embodiment, due to providing the seal layer 24, formed from a rubber that is a softer material than the thermoplastic resin and has resilient sealing ability (air tightness) to the portion making contact with the rim 20, and in particular with the rim flange 22, similar sealing ability is obtained to that of a conventional rubber pneumatic tire.

In the tire 10 of the present exemplary embodiment, due to provision of the tread rubber layer formed from a rubber of similar type to the rubber employed in the tread of a conventional rubber pneumatic tire, similar abrasion resistance and grip can be achieved to that of a conventional rubber pneumatic tire.

Other Exemplary Embodiments

Figure 3:
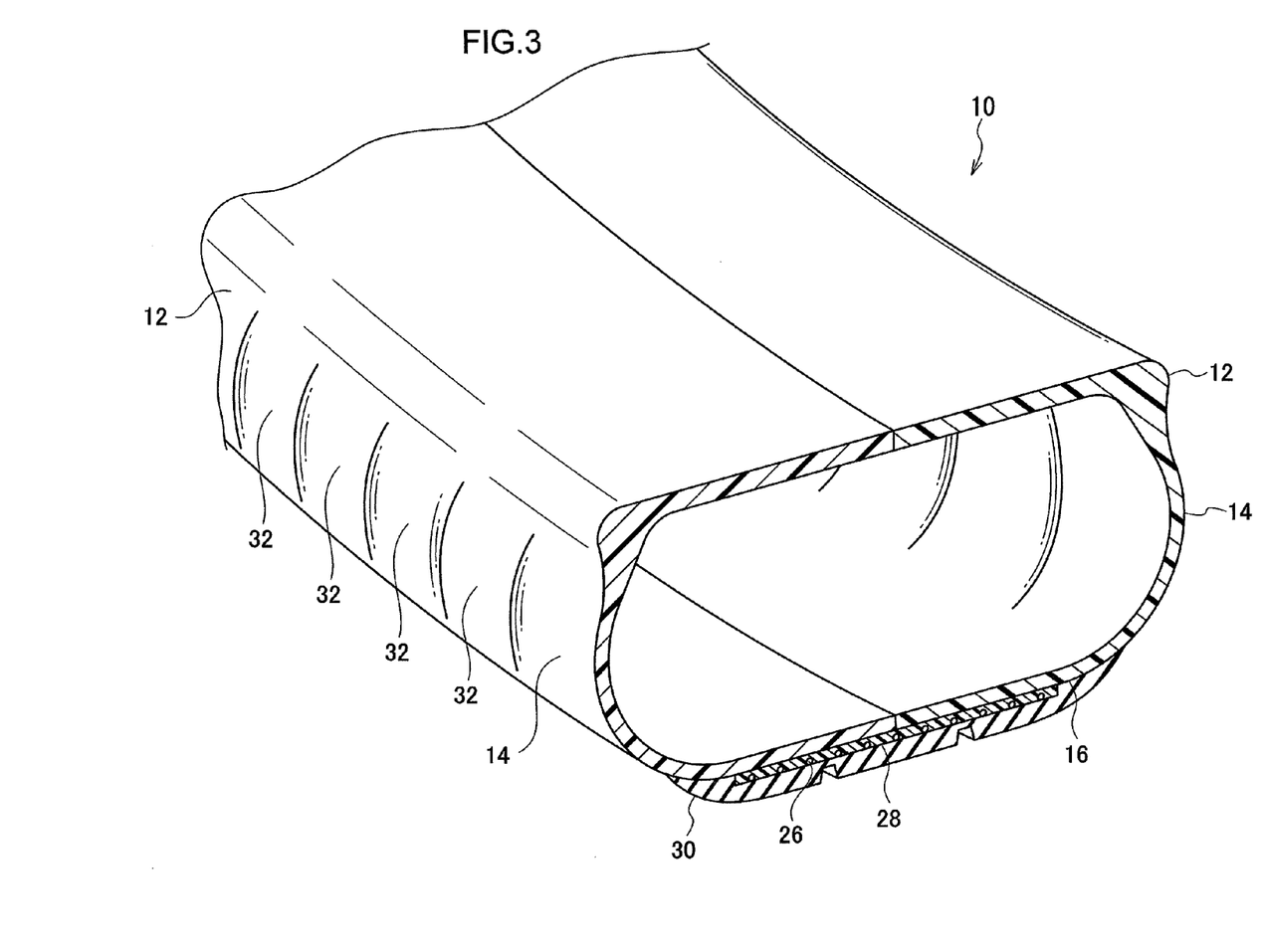
FIG. 3 is a perspective view of a cross-section of a portion of a tire according to another exemplary embodiment.

The tire 10 of the above exemplary embodiment forms an air chamber between the tire 10 and the rim 20 by mounting the bead sections 12 to the rim 20, to configure what is referred to as a tubeless type of tire. However, the present invention is not limited thereto, and a complete tube profile may be employed, such as that illustrated in FIG. 3.

Figure 4A:
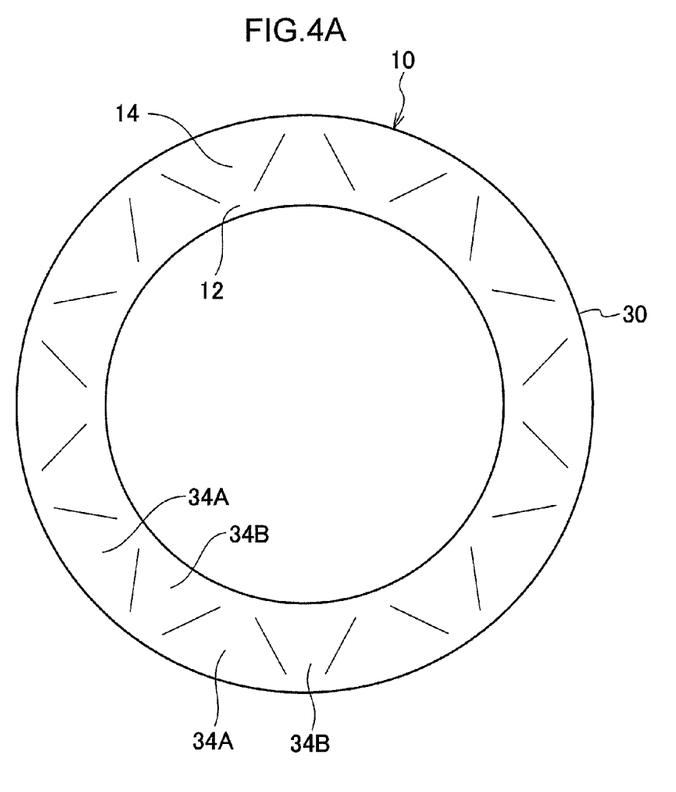
FIG. 4A is a side view of a tire according to another exemplary embodiment.
Figure 4B:
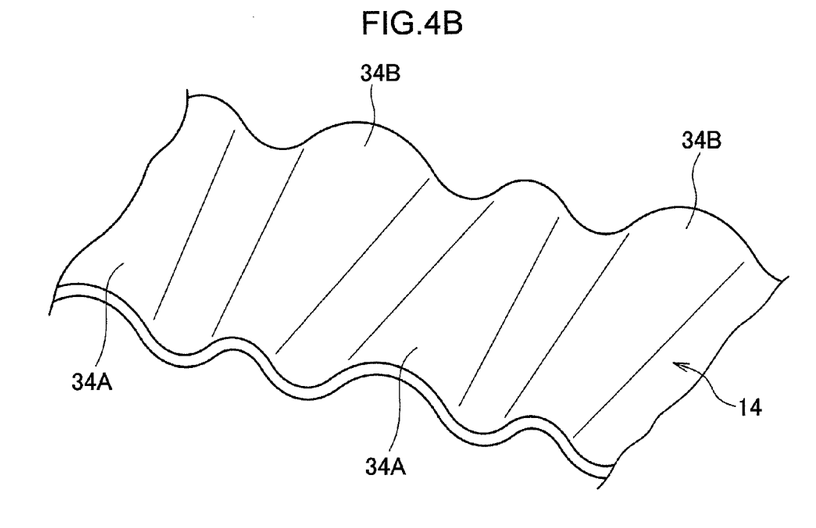
FIG. 4B is a perspective view illustrating a portion of a side section.

In the above exemplary embodiment, the side sections 14 are configured with plural circular arc curve faced portions 32 of the same shape formed successively around the circumferential direction, however, as shown in FIG. 4, the side sections 14 may be configured with alternately disposed first circular arc curve faced portions 34A having a narrower width at the tire radial direction inside portion than the outside portion, and second circular arc curve faced portions 34B having a narrower width at the tire radial direction outside portion than the inside portion.

Figure 5:
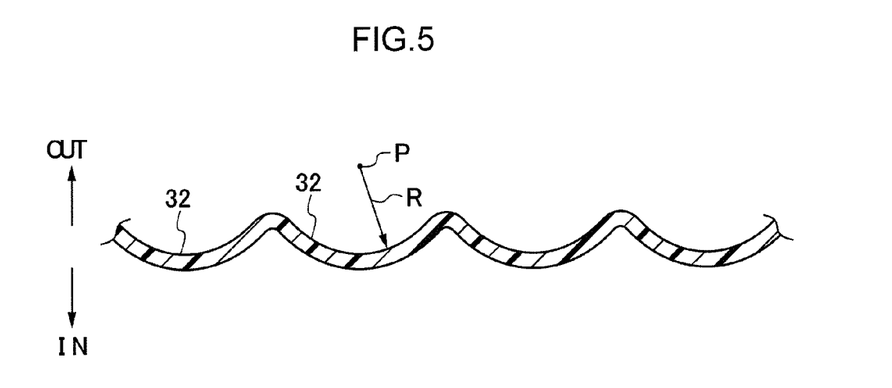
FIG. 5 is a cross-section of a side section according to another exemplary embodiment.
Figure 6:
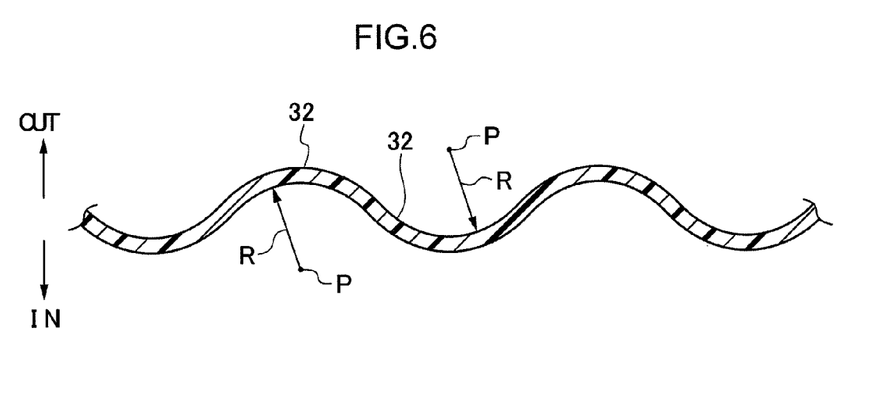
FIG. 6 is a cross-section of a side section according to another exemplary embodiment.

The circular arc curve faced portions 32 are not limited to those of the above exemplary embodiments, and various versions may be configured. Such as a version where there is a center of curvature on the tire outside (the arrow OUT direction side) as shown in FIG. 5, a version where there are alternately disposed centers of curvature Po on the tire outside and centers of curvature Pi on the tire inside (the arrow IN direction side) as shown in FIG. 6 (note that in the case of FIG.

Figure 7:
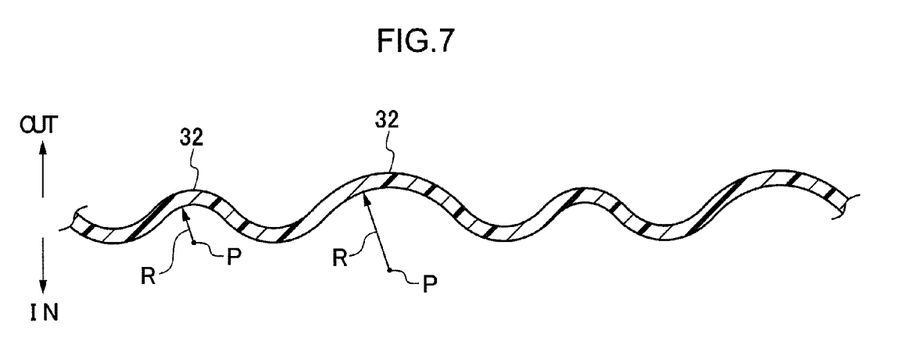
FIG. 7 is a cross-section of a side section according to another exemplary embodiment.
Figure 8:
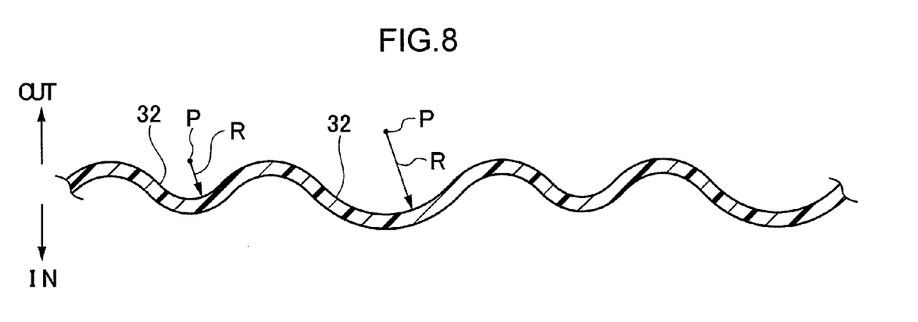
FIG. 8 is a cross-section of a side section according to another exemplary embodiment.

6 the radius of curvature Ro and the radius of curvature Ri may be different from each other), a version where there are centers of curvature disposed on the tire inside with alternately large and small radii of curvature as shown in FIG. 7, or a version in which there are centers of curvature disposed on the tire outside with alternately large and small radii of curvature as shown in FIG. 8.

Figure 9:
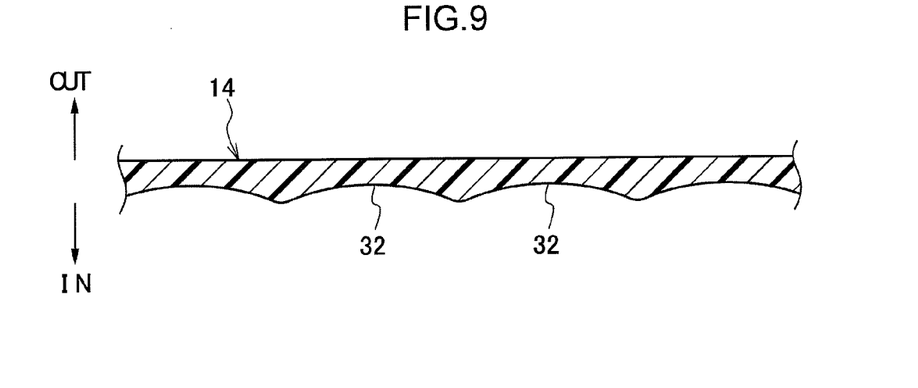
FIG. 9 is a cross-section of a side section according to another exemplary embodiment.
Figure 10:
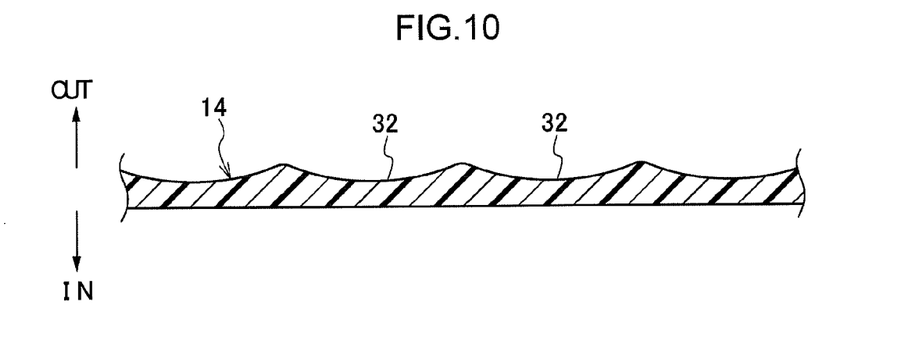
FIG. 10 is a cross-section of a side section according to another exemplary embodiment.
Figure 11:
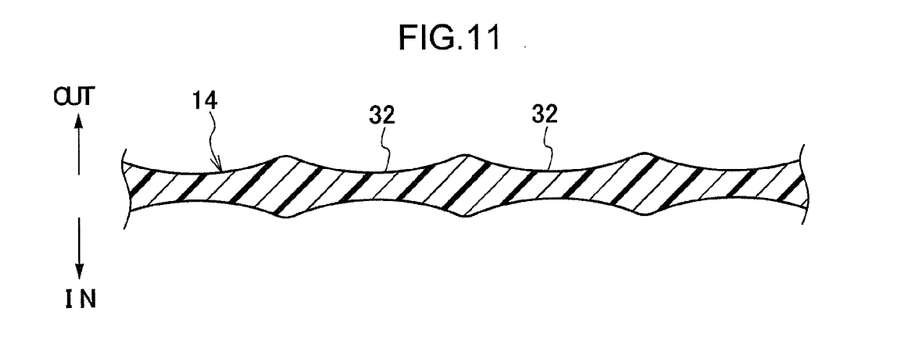
FIG. 11 is a cross-section of a side section according to another exemplary embodiment.

In the above exemplary embodiment, the thickness of the circular arc curve faced portion 32 is constant along the tire circumferential direction and along the tire radial direction, however configuration may be made such that thickness changes in either of the directions. For example, configuration may be made such that the outer peripheral face is flat and plural circular arc curve faced portions 32 are formed on the inner peripheral face side as shown in FIG. 9, or configuration may be made such that the inner peripheral face is flat and plural circular arc curve faced portions 32 are formed on the outer peripheral face side as shown in FIG. 10, or configuration may be made such that circular arc curve faced portions 32 are formed on both the inner peripheral face side and the outer peripheral face side as shown in FIG. 11.

Test Examples

In order to confirm the effect of the present invention a tire as a Comparative Example with an ordinary conventional side section profile without curvature on the side sections along the circumferential direction, and tires having curvature on the side sections along the circumferential direction as described above are prepared as Test Examples, and a comparison of pressure withstanding ability is performed.

Common Test Tire Specification

Tire Size: 155/65 R13
Type of Material: TPO
Thickness of Side Sections: Average Thickness 2.5 mm
Side Section Profiles: in the Comparative Example there are no circular arc curve faced portions along the circumferential direction. In the Test Examples plural circular arc curve faced portions are disposed at uniform intervals along the circumferential direction.

Pressure Withstanding Test Method: Each of the tires is mounted to a rim, inflated with water to apply internal pressure to the tire, and the hydraulic pressure at the point of tire burst is measured. An index is used in which the pressure at the point of tire burst for the Comparative Example is evaluated as being 100, with higher numerical values indicating superior pressure resisting ability.

TABLE 1

|  | Comparative Example | Test Example 1 | Test Example 2 | Test Example 3 | Test Example 4 |
| --- | --- | --- | --- | --- | --- |
| Radius of Curvature Rs | 25 mm | ← | ← | ← | ← |
| Radius of Curvature Rt | ∞ | 2.5 mm | 13 mm | 20 mm | 25 mm |
| Radius of Curvature Ratio Rt/Rs | ∞ | 0.1 | 0.5 | 0.8 | 1.0 |
| Pressure Withstanding Index | 100 | 151 | 135 | 124 | 118 |

It can be seen from the test results that the pressure withstanding ability can be greatly raised by providing radii of curvature along the circumferential direction of the side sections. When the radius of curvature ratio Rt/Rs of the radius Rt to the radius Rs is less than 0.01 then sometimes the rigidity of the side sections is too high, resulting in insufficient flexibility as a tire (resilience). When the radius of curvature ratio Rt/Rs exceeds 10 then sometimes the desired enhancement in pressure withstanding ability in the side sections becomes unattainable. Rt/Rs is more preferably from 0.1 to 1.0, inclusive.

The invention claimed is:

1. A tire comprising a pair of side sections and an outer peripheral section connecting together radial direction outside edges of the pair of side sections, wherein:
   at least the side sections are formed from a resin material; and
   a plurality of curved portions each having at least curvature in the tire circumferential direction are formed to the side sections along the tire circumferential direction,
   wherein a thickness of the plurality of curved portions is constant along the tire circumferential direction,
   wherein the plurality of curved portions comprise:
      a first curved portion having a first radius and a first center of curvature; and
      a second curved portion having a second radius and a second center of curvature, the first and second centers of curvature disposed on the same side on one of the tire inside and the tire outside, and
   wherein the first curved portion and the second curved portion are alternately disposed and each of the first and second radii has a different radius from each other.

2. The tire of claim 1, wherein the tire radial direction inside of each of the side sections comprises a bead section that makes contact with a bead seat and a rim flange of a rim, and a ring shaped bead core made from a metal material is embedded in the bead section.

3. The tire of claim 1, wherein the tire is configured by the resin material from the side sections to the outer peripheral section.

4. The tire of claim 1 further comprising a reinforcement layer formed by winding a cord, having higher rigidity than that of the resin material, in a spiral shape on the outer peripheral section with at least a portion of the cord embedded in the outer peripheral section.

5. The tire of claim 1 further comprising a seal portion provided at a portion of the tire that makes contact with the rim and configured from a material that is softer than the resin material such that air does not leak out from inside the tire.

6. The tire of claim 1 further comprising a tread rubber layer provided at the outer peripheral section for making road surface contact, the tread rubber layer configured from a rubber having abrasion resistance superior to that of the resin material.

7. The tire of claim 1, wherein the curved portions includes at least one of an inside curved portion having a center of curvature on the tire inside or an outside curved portion having a center of curvature on the tire outside.

8. The tire of claim 1 wherein the side sections satisfy the relationship 0.1<Rt/Rs<1.0, wherein Rs is the radius of curvature at a side section inside face when viewed in a cross-section taken along the tire rotation axis and Rt is the radius of curvature at the side section inside face when viewed in a cross-section taken along the tire circumferential direction.

9. The tire of claim 1 wherein the resin material has thermoplastic properties.

10. A tire comprising a pair of side sections and an outer peripheral section connecting together radial direction outside edges of the pair of side sections, wherein:
    at least the side sections are formed from a resin material; and
    a plurality of curved portions each having at least curvature in the tire circumferential direction are formed to the side sections along the tire circumferential direction, wherein the plurality of curved portions comprises a plurality of circular arc curve faced portions, and
wherein each of the plurality of circular arc curve faced portions comprises a center of curvature and the centers of curvature are alternately disposed on a tire inside and a tire outside along the tire circumferential direction,
wherein the plurality of circular arc curve faced portions comprise:
   a first circular arc curve faced portion having a first radius and a first center of curvature; and
   a second circular arc curve faced portion having a second radius and a second center of curvature, the first and second centers of curvature disposed on the same side on one of the tire inside and the tire outside, and
wherein the first circular arc curve faced portion and the second circular arc curve faced portion are alternately disposed and each of the first and second radii has a different radius from each other.

11. A tire comprising a pair of side sections and an outer peripheral section connecting together radial direction outside edges of the pair of side sections, wherein:
   at least the side sections are formed from a resin material; and
   a plurality of curved portions each having at least curvature in the tire circumferential direction are formed to the side sections along the tire circumferential direction,
wherein the plurality of curved portions comprises a plurality of circular arc curve faced portions, and
wherein the plurality of circular arc curve faced portions are disposed on each inner peripheral face side of the side sections,
wherein the plurality of circular arc curve faced portions comprise:
   a first circular arc curve faced portion having a first radius and a first center of curvature; and
   a second circular arc curve faced portion having a second radius and a second center of curvature, the first and second centers of curvature disposed on the same side on one of the tire inside and the tire outside, and
wherein the first circular arc curve faced portion and the second circular arc curve faced portion are alternately disposed and each of the first and second radii has a different radius from each other.

* * * * *